| United States Patent [19] | [11] Patent Number: 4,847,227 |
| Murai et al. | [45] Date of Patent: Jul. 11, 1989 |

[54] SOLID CATALYST COMPONENT FOR OLEFIN POLYMERIZATION CATALYSTS

[75] Inventors: Atsushi Murai; Minoru Terano; Kohei Kimura; Masuo Inoue; Katsuyoshi Miyoshi, all of Kanagawa, Japan

[73] Assignee: Toho Titanium Co., Ltd., Tokyo, Japan

[21] Appl. No.: 105,586

[22] Filed: Oct. 8, 1987

[30] Foreign Application Priority Data

Oct. 8, 1986 [JP] Japan ................. 61-237819

[51] Int. Cl.$^4$ ............................................. C08F 4/64
[52] U.S. Cl. ................... 502/127; 502/105; 502/129
[58] Field of Search ............... 502/127, 129, 105

[56] References Cited

U.S. PATENT DOCUMENTS

| | | | |
|---|---|---|---|
| 4,414,132 | 11/1983 | Goodall et al. | 502/127 X |
| 4,431,570 | 2/1984 | Johnson | 502/129 X |
| 4,550,095 | 10/1985 | Imai et al. | 502/127 X |
| 4,552,858 | 11/1985 | Imai et al. | 502/127 X |
| 4,588,703 | 5/1986 | Cowan et al. | 502/129 X |
| 4,686,199 | 8/1987 | Tachikawa et al. | 502/129 X |

*Primary Examiner*—Patrick P. Garvin
*Attorney, Agent, or Firm*—Birch, Stewart, Kolasch & Birch

[57] ABSTRACT

A solid catalyst component for olefin polymerization catalysts prepared by suspending diethoxymagnesium (a) in an aromatic hydrocarbon (b) which is liquid at normal temperature and bringing the suspension into a first contact with titanium tetrachloride (c) to form a product and bringing it into a second contact with tianium tetrachloride (c) in such manner that a diester (d) of an aromatic dicarboxylic acid and calcium chloride (e) are allowed to coexist at any stage of the above suspending and/or contacts, the calcium chloride (e) being used in an amount of 1-2 grams per gram of the diethoxymagnesium (a). This solid catalyst component exhibits, when applied to the polymerization of olefins, a surprisingly enhanced polymerization activity per titanium atom and a high stereospecific performance and scarcely necessitates any deashing treatment, thus affording a great economical advantage.

52 Claims, No Drawings

SOLID CATALYST COMPONENT FOR OLEFIN POLYMERIZATION CATALYSTS

BACKGROUND OF THE INVENTION

1. Field of the Invention:

The present invention relates to a high performance solid catalyst component for olefin polymerization catalysts. More particularly, the present invention relates to a new type solid catalyst component capable of exhibiting, when applied to the polymerization of olefins, a high polymerization activity combined with a high stereospecific performance, especially a surprisingly enhanced polymerization activity per titanium atom contained therein.

2. Description of the Prior Art:

From the past, various kinds of olefin polymerization catalysts have been known and widely utilized which are derived from a solid catalyst component comprising a titanium halide and an organoaluminum compound and possess a high catalytic activity. According to these olefin polymerization catalysts, however, the yield of olefin polymers per catalyst component or per titanium atom contained therein does not reach a satisfactorily high level. Thus, a number of studies have been made hitherto for increasing the yield of olefin polymers per catalyst component. In case the yield of olefin polymers per titanium atom is low, the titanium component remaining in the resultant polymers having a strong corrosive action not only causes serious damage of the polymerization apparatus or various devices used in the after-treatment but also gives bad influence on the resultant polymer itself, such as deterioration of its quality or yellowing of the polymer. Hence, there was a strong demand in this art to solve such problems. Although studies have been made to solve the problems by minimizing the titanium content in the catalyst component or by increasing the yield of polymers per unit weight of the catalyst component, a satisfactory result has not yet been obtained for both of the above means. In the majority of cases, a deashing step was needed in the prior arts to eliminate the residual titanium component. As the deashing step requires a large amount of an alcohol or a chelating agent, facilities for recovering or regenerating the alcohol or chelating agent are necessary, thus creating many incidental problems in aspects of resource, energy and the like factors. These were important problems to be solved in carrying out the process for polymerization of olefins in a commercial scale. In recent years, a variety of proposals have been presented to overcome the above mentioned problems. In general, the yield of olefin polymers will be decreased if the titanium content in the catalyst component is suppressed. On the other hand, the titanium content in the catalyst component will become higher if an increased yield of olefin polymer per unit weight of the catalyst component is desired. Thus, it is the current status that any of the proposals cannot overcome the problem that the yield of olefin polymers per titanium atom is low.

In Japanese Patent Publn. No. Sho. 56-52041, for example, there is proposed that a magnesium halide is contacted with an anhydrous compound of an element belonging to Group I, II, III or IV of the Periodic Table to decrease the titanium content in the catalyst component thereby enhancing the activity per titanium. In this prior art, however, the polymerization activity per catalyst component is extremely low, and as the result, the polymerization activity per titanium cannot be said to be satisfactory.

As the amount of an expensive organoaluminum compound used at the time of polymerization is defined in many cases by an Al/Ti molar ratio, a higher titanium content in the catalyst component substantially means the use of a large amount of the organoaluminum compound, thus causing an increase in a unit price of the catalyst in terms of a total catalyst including the organoaluminum compound even if the catalytic activity shows a high value of a certain degree.

Under the circumstances, there is a great demand in this art to develop a new type solid catalyst component which overcomes the problems seen in the prior art catalyst components and can increase the yield of stereospecific olefin polymers per catalyst component.

BRIEF SUMMURY OF THE INVENTION

Accordingly, it is an object of the present invention to provide a new solid catalyst component having an extremely low titanium content.

It is another object of the present invention to provide a solid catalyst component capable of exhibiting, when applied to the polymerization of olefins, an extremely high polymerization activity combined with a high stereospecific performance.

It is still another object of the present invention to provide a solid catalyst component capable of maintaining enhanced polymerization activity per titanium atom for an extended period of time.

It is further object of the present invention to provide a solid catalyst component which does not necessitate any deashing treatment and affords remarkable economical advantages.

Other and further objects, features and advantages of the present invention will be apparent more fully from the following description.

DETAILED DESCRIPTION OF THE INVENTION

Taking the above mentioned circumstances into consideration, the present inventors have made extensive researches for developing a new solid catalyst component for olefin polymerization catalysts, which overcomes the various drawbacks seen in the prior art catalyst components and enables the production of stereospecific polymers in a higher yield per titanium atom contained in the catalyst component. As a result of such extensive researches, it has now been found surprisingly that a solid catalyst component derived from diethoxymagnesium, titanium tetrachloride, a diester of an aromatic carboxylic acid, calcium chloride and optionally a specific silicon compound according to specific treatments conducted in a special order of succession under specific conditions has a remarkably high polymerization activity per titanium atom combined with stereospecific performance and scarcely incurs problems of corrosion of apparatus and deterioration in quality of the resultant polymer. The present invention has been accomplished on the basis of the above finding.

In accordance with the present invention, there is provided a solid catalyst component for olefin polymerization catalysts prepared by suspending diethoxymagnesium (a) in an aromatic hydrocarbon (b) which is liquid at normal temperature and bringing the resultant suspension into a first contact with titanium tetrachloride (c) to form a product and bring it into a second contact with titanium tetrachloride (c) in such manner that a diester (d) of an aromatic dicarboxylic acid and calcium chloride (e) are allowed to coexist at any stage of the above suspending and/or contacts, the calcium chloride (e) being used in an amount of 1-2 grams per gram of the diethoxymagnesium (a).

The solid catalyst component of the present invention has various features as compared with the prior art solid catalyst components showing inferior polymerization activity per titanium atom contained therein. One of the features of this invention resides in the use of a combination of specific sorts of ingredients with specific conditions. In the solid catalyst component of this invention, diethoxymagnesium, titanium tetrachloride, an aromatic hydrocarbon, calcium chloride and a diester of an aromatic carboxylic acid are used as constituents for the catalyst component under specific conditions, i.e. specific treatments in a special order of succession. Another feature resides in the mode of contact with titanium tetrachloride; in the course of preparing the solid catalyst component, titanium tetrachloride is brought into contact twice with the other ingredients. The polymerization activity of the catalyst component can remarkably be enhanced by such special contact mode.

The aromatic hydrocarbon (b) which is liquid at normal temperature [referred to hereinafter simply as the substance (b)] is selected from benzene and alkylbenzenes having 1-3 alkyl groups each with 1-4 carbon atoms. Examples of the alkylbenzenes include toluene, xylene, trimethylbenzene and ethylbenzene. The use of toluene is preferable in the present invention. Besides these aromatic hydrocarbons (b), halogenated hydrocarbons such as 1,2-dichloroethane and o-dichlorobenzene can also be used equivalently as the substance (b).

The diester (d) of an aromatic carboxylic acid [referred to hereinafter simply as the substance (d)] is usually selected from dialkyl esters of phenylenedicarboxylic acids. The two alkyl moieties may be the same or different and each with 1-8 carbon atoms. The phenylenedicarboxylic acid is preferably phthalic acid or terephthalic acid. Illustrative of the preferable substance (d) are, for example, dimethyl phthalate, diethyl phthalate, dipropyl phthalate, diisopropyl phthalate, dibutyl phthalate, diisobutyl phthalate, diamyl phthalate, diisoamyl phthalate, methyl ethyl phthalate, methyl propyl phthalate, methyl butyl phthalate, methyl isobutyl phthalate, ethyl propyl phthalate, ethyl butyl phthalate, ethyl isobutyl phthalate, propyl butyl phthalate, propyl isobutyl phthalate, propyl amyl phthalate, butyl amyl phthalate, dimethyl terephthalate, diethyl terephthalate, dipropyl terephthalate, diisopropyl terephthalate, dibutyl terephthalate, diisobutyl terephthalate, diamyl terephthalate, diisoamyl terephthalate, methyl ethyl terephthalate, methyl propyl terephthalate, methyl butyl terephthalate, methyl isobutyl terephthalate, ethyl propyl terephthalate, ethyl butyl terephthalate, ethyl isobutyl terephthalate, propyl butyl terephthalate, propyl isobutyl terephthalate, propyl amyl terephthalate and butyl amyl terephthalate. Among these diesters, lower ($C_1$-$C_4$) dialkyl diesters wherein the alkyl groups are identical with each other are most preferable, such as diethyl phthalate, dipropyl phthalate, dibutyl phthalate, diisobutyl phthalate, diamyl phthalate, diethyl terephthalate, dipropyl terephthalate, dibutyl terephthalate, diisobutyl terephthalate and diamyl terephthalate.

The diethoxymagnesium (a) [referred to hereinafter simply as the substance (a)], titanium tetrachloride (c) [referred to hereinafter simply as the substance (c)] and calcium chloride (e) [referred to hereinafter simply as the substance (e)] are all commercially available or may be prepared according to the process known per se.

In this invention, the substance (e) is used in an amount of 1-2 g per gram of the substance (a). As to the other substances, no particular limitation exists in their proportion so far as it gives no bad influence on the quality of the resultant catalyst. Usually, however, the substance (c) is used in an amount of at least 1 g, preferably at least 2 g per gram of the substance (a) at the time of the first contact with the substance (a) or with the substance (a) and the substance (e). The substance (b) is used in an appropriate amount so far as the amount is sufficient enough to form a suspension with the substance (a) or with the substance (a) and the substance (e). The substance (d) is used in an amount within the range of 0.05-10 m-mol, preferably 0.2-5 m-mol per gram of the total amount of the substance (a) and the substance (e). The amount of the substance (c) used for the second contact is at least 1 g, preferably at least 2 g per gram of the substance (a), as in the case of the first contact.

A complicate limitation exists in the order of contact of the individual ingredients. Thus, there are some preferable modes for preparing the solid catalyst components in connection with the order of contact of the individual ingredients. According to a first mode, the substance (a) and the substance (e) are subjected to copulverization by the aid of a ball mill, a vibrating mill, a column grinder or the like finely dividing means and the resultant copulverized composition is contacted in the presence of the substance (d) with the substance (b) and the substance (c). A product thus obtained is then contacted again with the substance (c). According to the second mode, the substance (a) and the substance (e) are suspended in the substance (b), and the resultant suspension is contacted in the presence of the substance (d) with the substance (c). A product thus obtained is then contacted again with the substance (c). According to the third mode, the substance (a) is suspended in the substance (b) and then contacted with the substance (c) in the presence of the substance (d). A product thus obtained is mixed with the substance (e) and then contacted again with the substance (c). According to the fourth mode, the substance (a) is suspended in the substance (b) and then contacted with the substance (c) in the presence of the substance (d). A product thus obtained is contacted again with the substance (c) in the coexistence of the substance (e). The temperature during the first contact wherein the substance (a) and the substance (b) are contacted with the substance (c) is usually within the range of 50°-136° C., preferably 80°-136° C. The time for the above first contact is within a period from 5 minutes to 100 hours, preferably from 5 minutes to 10 hours. After this first contact, the resultant product may be washed repeatedly with the substance (b) or other organic solvents, if necessary. The product is successively brought into the second contact with the substance (c). This second contact is carried out under the same conditions as in the first contact, e.g. at a temperature of 50°-136° C., preferably 80°-136° C. and within a period from 5 minutes to 100 hours, preferably from 5 minutes to 10 hours. The substance (b) can be used singly or as a mixture or, if desired, together with other organic solvents. The solid catalyst component thus obtained may be washed, if necessary, with an organic solvent such as n-heptane. A series of these operations in the preparation of the solid catalyst component are usually carried out in the absence of air and moisture to prevent any deterioration of the quality of the solid catalyst component.

The solid catalyst component obtained according to this invention is used as such for the preparation of an olefin polymerization catalyst or may be stored in dry state, in wet state or in an inert medium for a prolonged period of time without any reduction in its performance.

In the preparation of an olefin polymerization catalyst, the solid catalyst component is combined with an organoaluminum compound such as triethylaluminum. On the use of such olefin polymerization catalyst for polymerizing olefins, it is preferable to use an electron donor, for example, an organosilicon compound such as phenyltriethoxysilane jointly with the catalyst. A polymerization reaction of olefins can be carried out in the presence or absence of an organic solvent. An olefin monomer can be used for this reaction either in gaseous or liquid state. Thus, the term "polymerization" merely used herein means any type of the polymerizations including homopolymerization and copolymerization of olefins as well as any mode of the polymerization including gas or bulk polymerization in the absence of any polymerization solvent and slurry or solution polymerization where a polymerization solvent is used. The polymerization temperature is below 200° C., preferably below 100° C. and the polymerization pressure is below 100 kg/cm$^2$.G, preferably below 50 kg/cm$^2$.G.

Olefins utilizable for the polymerization or copolymerization wherein the solid catalyst of this invention is used are C$_2$-C$_4$ α-olefins and involve ethylene, propylene and butene-1.

In case the polymerization of olefin is carried out by using a catalyst derived from the solid catalyst component of this invention, the yield of olefin polymers per solid catalyst component, or in other words, the polymerization activity per solid catalyst component is remarkably high notwithstanding the titanium content (titanium carrier ratio) in the solid catalyst component is extremely low, and as the result, the residual titanium content in the resultant polymer is so negligible that any deashing treatment is scarecely necessary and there arises no problem of deterioration and yellowing of the resultant polymer.

In many cases, the molar ratio of Al in an organoaluminum compound to Ti in the solid catalyst component, i.e. Al/Ti molar ratio, is usually fixed within a certain range in the polymerization of olefins. In such case, the yield of olefin polymers per catalyst component is remarkably high without varying the Al/Ti molar ratio notwithstanding the titanium content in the solid catalyst component is extremely low. Consequently, the amount of an organoaluminum compound to be used together can be decreased to reduce cost of the total catalyst.

In case the polymerization of olefins is carried out by the aid of a catalyst derived from the solid catalyst component of this invention, reduction in the polymerization activity with the lapse of time is extremely low.

Further, a catalyst derived from the solid catalyst component of this invention achieves an additional merit that its catalytic activity and stereospecific performance are scarecely deteriorated in case of performing the polymerization of olefins in the coexistence of hydrogen.

The present invention will now be illustrated in more detail by way of Examples and Comparative Example.

EXAMPLE 1

(1) Preparation of the solid catalyst component:

In a 1.2 liter vibrating mill pot charged up to 3/5 of the whole capacity with stainless steel balls of 25 mmφ in diameter, the air in which had been substituted sufficiently with nitrogen, were placed 45 g of calcium chloride and 45 g of diethoxymagnesium. The mixture was subjected to a co-grinding treatment operated for 5 hours at room temperature at a vibration number of 1430 v.p.m. and an amplitude of 3.5 mm. In a 500 ml round-bottomed flask equipped with a stirrer, the air in which had been substituted sufficiently with nitrogen, were placed 9 g of the composition obtained by the preceding pulverization treatment and 50 ml of toluene. The mixture was well contacted together for 5 minutes. To the mixture was added 50 ml of TiCl$_4$, and the mixture was heated up to 90° C. After adding 1.9 g of n-dibutyl phthalate, the mixture was heated up to 115° C. and reacted together for 2 hours under agitation. The resultant solid product was collected by filtration and washed with 100 ml of fresh toluene at 90° C. To the solid product were then added 40 ml of TiCl$_4$ and 60 ml of toluene, and the mixture was reacted together for 2 hours at 115° C. with stirring. After completion of the reaction, the reaction mixture was cooled down to 40° C. and washed repeatedly with n-heptane. The washing treatment was finished at the time chlorine was no longer detected in the washings, whereby a solid catalyst component was obtained. By the way, a solid matter and a liquid in the solid catalyst component were separated and the solid matter was subjected to elementary analysis whereupon the contents in terms of % by weight as follows: Ca 16.5 , Mg 9.7, Cl 61.2 and Ti 1.21.

(2) Polymerization:

In a 2.0 liter autoclave equipped with a stirrer, the air in which had been replaced entirely by nitrogen, were placed 700 ml of n-heptane. The autoclave was charged successively with 181 mg of triethylaluminum, 38 mg of phenyltriethoxysilane and the solid catalyst component in an amount of 0.3 mg in terms of titanium, while maintaining the nitrogen atmosphere. Into the autoclave was then charged 120 ml of hydrogen and the mixture was heated to 70° C. Gaseous propylene was introduced into the autoclave and subjected to polymerization reaction for 2 hours while maintaining the pressure at 6 kg/cm$^2$.G.

After the polymerization reaction, the resultant solid polymer was collected by filtration and warmed at 80° C. under reduced pressure for drying. On the other hand, the filtrate was concentrated to obtain a polymer having been dissolved in the polymerization solvent. The solid polymer was extracted with boiling n-heptane for 6 hours to obtain a polymer insoluble in n-heptane. Designating the amount of the polymer dissolved in the polymerization solvent as (A), the amount of the solid polymer as (B) and the amount of the polymer insoluble in n-heptane as (C), the polymerization activity (D) per Ti of solid catalyst component can be calculated according to the following formula:

$$(D) = \frac{[(A) + (B)] (g)}{\text{Amount of Ti of the solid catalyst component (mg)}}$$

The yield (E) of the crystalline polymer is calculated according to the following formula:

$$(E) = \frac{(C)}{(B)} \times 100\ (\%)$$

The yield (F) of the total crystalline polymer is calculated according to the following formula:

$$(F) = \frac{(C)}{(A) + (B)} \times 100\ (\%)$$

A result of the polymerization is shown in Table 1 wherein the melt index of the resultant polymer is designated as (G).

EXAMPLE 2

The preparation of a solid catalyst component was carried out in the same manner as illustrated in Example 1 except that the amount of n-dibutyl phthalate was 2.2 g. By the way, a solid matter and a liquid in the resultant solid catalyst component were separated and the solid matter was subjected to elementary analysis whereupon the contents in terms of % by weight were as follows: Ca 16.8, Mg 9.8, Cl 61.0 and Ti 1.25.

As experiment for polymerization was carried out in the same manner as described in Example 1. A result of the experiment is shown in Table 1.

EXAMPLE 3

An experiment for polymerization was carried out in the same manner as described in Example 1 except that 65 mg of diphenyl-dimethoxysilane was used in place of phenyltriethoxysilane. A result of the experiment is shown in Table 1.

EXAMPLE 4

(1) Preparation of a solid catalyst component:

In a 500 ml round-bottomed flask equipped with a stirrer, the air in which had been substituted sufficiently with nitrogen, were placed 4.5 g of calcium chloride, 4.5 g of diethoxymagnesium and 50 ml of toluene. The mixture was contacted together for 1 hour at 50° C. under agitation. To the mixture was added 50 ml of TiCl$_4$, and the mixture was heated up to 90° C. After adding 1.9 g of n-butyl phthalate, the mixture was further heated up to 115° C. and reacted for 2 hours under agitation. The resultant solid product was collected by filtration and washed with 100 ml of fresh toluene at 90° C. To the solid product were then added 40 ml of TiCl$_4$ and 60 ml of toluene, and the mixture was reacted together for 2 hours at 115° C. with stirring. After completion of the reaction, the mixture was cooled down to 40° C. and washed repeatedly with n-heptane. The washing treatment was finished at the time chlorine was no longer detected in the washings, whereby a solid catalyst component was obtained. By the way, a solid matter and a liquid in the solid catalyst component were separated and the solid matter was subjected to elementary analysis whereupon the contents in terms of % by weight were as follows: Ca 16.7, Mg 9.9, Cl 60.8 and Ti 1.14.

(2) Polymerization

An experiment for polymerization was carried out in the same manner as described in Example 1. A result of the experimentis shown in Table 1.

EXAMPLE 5

(1) Preparation of a solid catalyst component:

In a 500 ml rount-bottomed flask equipped with a stirrer, the air in which had been substituted sufficiently with nitrogen, were placed 10 g of diethoxymagnesium and 60 ml of toluene. The mixture was suspended for 5 minutes with stirring. To the mixture was added 20 ml of TiCl$_4$ and the mixture was heated up to 90° C. After adding 2.7 g of n-dibutyl phthalate, the mixture was further heated up to 115° C. and reacted for 2 hours under agitation. After completion of the reaction, the resultant solid product was collected by filtration and washed with 80 ml of fresh toluene at 90° C. To the solid product were then added 120 ml of toluene and 10 g of CaCl$_2$, and the mixture was reacted together for 2 hours at 90° C. After adding 40 ml of TiCl$_4$, the mixture was heated up to 115° C. and reacted together for 2 hours. After completion of the reaction, the reaction mixture was cooled down to 40° C. and washed repeatedly with n-heptane. The washing treatment was finished at the time chlorine was no longer detected in the washings whereupon a solid catalyst component was obtained. By the way, a solid matter and a liquid in the solid catalyst component were separated and the solid matter was subjected to elementry analysis whereupon the contents in terms of % by weight were as follows: Ca 16.7, Mg 10.2, Cl 60.8 and Ti 1.30.

(2) Polymerization

An experiment for polymerization was carried out in the same manner as described in Example 1. A result of the experiment is shown in Table 1.

EXAMPLE 6

(1) Preparation of a solid catalyst component:

In a 500 ml round-bottomed flask equipped with a stirrer, the air in which had been substituted sufficiently with nitrogen, were placed 4.5 g of diethoxymagnesium and 20 ml of toluene. The mixture was suspended for 5 minutes with stirring. To the mixture was added 60 ml of TiCl$_4$ and the mixture was heated up to 90° C. After adding 1.9 g of n-dibutyl phthalate, the mixture was further heated up to 115° C. and reacted under agitation.

On the other hand, in a 500 ml round-bottomed flask equipped with a stirrer, the air in which had been substituted sufficiently with nitrogen, were placed 4.5 g of calcium chloride and 20 ml of toluene. The mixture was agitated for 5 minutes at 90° C. to form a suspension. Then, the whole suspension was added to the above resultant product in the first flask and the whole mixture was contacted together for 2 hours at 115° C. under agitation. The resultant solid product was collected by filtration and washed with 100 ml of fresh toluene at 90° C. To the solid product were then added 60 ml of TiCl$_4$ and 40 ml of toluene, and the mixture was reacted together for 2 hours at 115° C. with stirring.

After completion of the reaction, the reaction mixture was cooled down to 40° C. and washed repeatedly with n-heptane. The washing treatment was finished at the time chlorine was no longer detected in the washings, whereby a solid catalyst component was obtained. By the way, a solid matter and a liquid in the solid catalyst component were separated and the solid matter was subjected to elementary analysis whereupon the contents in terms of % by weight were as follows: Ca 16.6, Mg 9.8, Cl 61.0 and Ti 1.38.

(2) Polymerization

An experiment for polymerization was carried out in the same manner as described in Example 1. A result of the experiment is shown in Table 1.

(2) Polymerization:

An experiment was carried out in the same manner as illustrated in Example 1 except that 0.5 mg of the catalyst component in terms of Ti atom and 120 mg of triethylaluminum were used but phenyltriethoxysilane was not used. A result of the experiment is also shown in Table 1.

TABLE 1

|  | Examples | | | | | | Comparative Examples | |
|---|---|---|---|---|---|---|---|---|
|  | 1 | 2 | 3 | 4 | 5 | 6 | 1 | 2 |
| Amount of the polymer dissolved in the polymerization solvent (A) (g) | 3.3 | 3.0 | 3.6 | 3.7 | 2.5 | 3.2 | 3.1 | 4.5 |
| Amount of the solid polymer (B) (g) | 273 | 249 | 306 | 285 | 246 | 258 | 244 | 16.1 |
| Amount of the polymer insoluble in boiling n-heptune (C) (g) | 269 | 246 | 302 | 281 | 243 | 254 | 241 | 11.6 |
| Polymerization activity per Ti of solid catalyst component (D) | 920 | 840 | 1030 | 960 | 830 | 870 | 490 | 41 |
| Yield of the crystalline polymer (E) (%) | 98.5 | 98.7 | 98.5 | 98.5 | 98.8 | 98.5 | 98.6 | 72.1 |
| Yield of the total crystalline polymer (F) (%) | 97.3 | 97.5 | 97.4 | 97.2 | 97.8 | 97.3 | 97.4 | 56.2 |
| MI of the resultant polymer (G) | 5.2 | 6.8 | 4.8 | 7.3 | 7.6 | 6.3 | 6.5 | 8.5 |

COMPARATIVE EXAMPLE 1

An experiment was carried out in the same manner as illustrated in Example 4 except that calcium chloride was not used but 9 g of diethoxymagnesium and 2.5 g of n-dibutyl phthalate were used at the time of preparing the solid catalyst component. In this case, a solid matter and a liquid in the solid catalyst component were separated and the solid matter was subjected to elementary analysis whereupon the contents in terms of % by weight as follows Mg 18, Cl 62 and Ti 3.12.

On polymerization of propylene, an experiment was carried out in the same manner as illustrated in Example 1 except that 0.5 mg of the solid catalyst component in terms of titanium atom, 301 mg of triethylaluminum and 64 mg of phenyltriethoxysiliane were used. A result of the experiment is shown in Table 1.

COMPARATIVE EXAMPLE 2

(1) Preparation of the solid catalyst component:

In a 1.0 liter vibrating mill pot charged up to 3/5 of the whole capacity with stainless steel balls of 25 mmφ were placed 5 g of anhydrous MgCl$_2$, 40 g of anhydrous LiCl and 5.4 g of TiCl$_4$ in nitrogen atmosphere. The mixture was subjected to a pulverizing treatment for 16 hours at a vibration number of 1460 v.p.m. and an amplitude of 3.5 mm.

In a 500 ml round-bottomed flask equipped with a stirrer, the air in which had been substituted sufficiently with nitrogen, were placed 5 g of the above pulverized product suspended in 120 ml of anhydrous n-heptane and 0.84 g of N,N', N'', N''' -tetramethylethylenediamine. The mixture was allowed to stand for 45 minutes at room temperature with stirring. The mixture was then diluted with 300 ml of n-heptane to form a catalyst component. A solid matter and a liquid in the catalyst component was separated and the solid matter was subjected to elementary analysis whereupon the Ti content therein was 1.02% by weight.

It is understood that the preceding representative examples may be varied within the scope of the present specification both as to reactants and reaction conditions, by one skilled in the art to achieve essentially the same results.

As many widely different embodiments of this invention may be made without departing from the spirit and scope thereof, it is to be construed that this invention is not limited to the specific embodiments thereof except as defined in the appended claims.

What is claimed is:

1. A solid catalyst component for olefin polymerization catalyst prepared by suspending diethoxymagnesium (a) in an aromatic hydrocarbon (b) which is liquid at normal temperature and reacting the suspension with a first portion of titanium tetrachloride (c) to form a product and subsequently reacting said product with a second portion of titanium tetrachloride (c), and wherein a diester (d) of an aromatic dicarboxylic acid and calcium chloride (e) are added at any stage of the above suspending and/or reacting steps, the calcium chloride (e) being used in an amount of 1-2 grams per gram of the diethoxymagnesium (a).

2. A solid catalyst component according to claim 1, wherein the diethoxymagnesium (a) and the calcium chloride (e) are copulverized, the resultant pulverized composition is suspended in the aromatic hydrocarbon (b), the suspension is reacted with a first portion of the titanium tetrachloride (c) to form a product, and said product is reacted with a second portion of the titanium tetrachloride (c), and wherein the diester (d) is added during the above suspending and/or reacting steps.

3. A solid catalyst component according to claim 1, wherein the diethoxymagnesium (a) and the calcium chloride (e) are suspended in the aromatic hydrocarbon (b) under agitation and the suspension is reacted with a first portion of the titanium tetrachloride (c) to form a product, and said product is reacted with a second portion of the titanium tetrachloride (c), and wherein the diester (d) is added during the above suspending and/or reacting steps.

4. A solid catalyst component according to claim 1, wherein the diethoxymagnesium (a) is suspended in the aromatic hydrocarbon (b), the suspension is reacted with a first portion of the titanium tetrachloride (c) and calcium chloride (e) to form a product, and said product is reacted with a second portion of the titanium tetrachloride (c), and wherein the diester (d) is added during the above suspending and/or reacting steps.

5. A solid catalyst component according to claim 1, wherein the diethoxymagnesium (a) is suspended in the aromatic hydrocarbon (b), the suspension is reacted with a first portion of the titanium tetrachloride (c) to form a product, and said product is reacted with a second portion of the titanium tetrachloride (c) and the calcium chloride (e), and wherein the diester (d) is added during the above suspending and/or reacting steps.

6. A solid catalyst component according to any one of claims 1-5, wherein the aromatic hydrocarbon (b) is benzene or an alkylbenzene.

7. A solid catalyst component according to claim 6, wherein the aromatic hydrocarbon (b) is toluene.

8. A solid catalyst component according to any one of claims 1-5, wherein the diester (d) is a diester of phthalic or terephthalic acid.

9. A solid catalyst component according to claim 8, wherein the diester (d) is dimethyl phthalate, dimethyl terephthalate, diethyl phthalate, diethyl terephthalate, dipropyl phthalate, dipropyl terephthalate, dibutyl phthalate, dibutyl terephthalate, diisobutyl phthalate, diamyl phthalate, diisoamyl phthalate, ethyl isobutyl phthalate and ethyl propyl phthalate.

10. A solid catalyst component according to any one of claims 1-5, wherein said first and second portions of titanium tetrachloride (c) each represent at least 1 g of titanium tetrachloride (c) per gram of the diethoxymagnesium (a).

11. A solid catalyst component according to claim 10, wherein said first and second portions of titanium tetrachloride (c) each represent at least 2 g of titanium tetrachloride (c) per gram of the diethoxymagnesium.

12. A solid catalyst component according to any one of claims 1-5, wherein the aromatic hydrocarbon (b) is used in an amount sufficient to form a suspension of the diethoxymagnesium (a) or the diethoxymagnesium (a) and the calcium chloride (e).

13. A solid catalyst component according to any one of claims 1-5, wherein the diester (d) is used in an amount of 0.05-10 m-mol per gram of the total amount of the diethoxymagnesium (a) and the calcium chloride (e).

14. A solid catalyst component according to claim 13, wherein the diester (d) is used in an amount of 0.2-5 m-mol per gram of the total amount of the diethoxymagnesium (a) and the calcium chloride (e).

15. A solid catalyst component according to claim 2, wherein the copulverization of the diethoxymagnesium (a) and the calcium chloride (e) is effected by the aid of a vibration mill, ball mill or column grinder.

16. A solid catalyst component according to claim 15, wherein the copulverization of the diethoxymagnesium (a) and the calcium chloride (e) is effected within a period from 5 minutes to 100 hours.

17. A solid catalyst component according to any one of claims 1-5, and 15-16, wherein the temperature during reaction with the first or second portion of titanium tetrachloride (c) is within the range of 50°-136° C.

18. A solid catalyst component according to claim 17, wherein said temperature is within the range of 80°-136° C.

19. A solid catalyst component according to any one of claims 1-5, 15 and 16, wherein said first and second portions of titanium tetrachloride (c) are reacted for a period of from 5 minutes to 100 hours.

20. A solid catalyst component according to claim 19, wherein said reaction time period is from 5 minutes to 10 hours.

21. A solid catalyst component according to claim 6, wherein the temperature during reaction with the first or second portion of titanium tetrachloride is within the range of 50°-136° C.

22. A solid catalyst component according to claim 8, wherein the temperature during reaction with the first or second portion of titanium tetrachloride is within the range of 50°-136° C.

23. A solid catalyst component according to claim 10, wherein the temperature during reaction with the first or second portion of titanium tetrachloride is within the range of 50°-136° C.

24. A solid catalyst component according to claim 12, wherein the temperature during reaction with the first or second portion of titanium tetrachloride is within the range of 50°-136° C.

25. A solid catalyst component according to claim 13, wherein the temperature during reaction with the first or second portion of titanium tetrachloride is within the range of 50°-136° C.

26. A solid catalyst component according to claim 6, wherein said temperature is within the range of 80°-136° C.

27. A solid catalyst component according to claim 8, wherein said temperature is within the range of 80°-136° C.

28. A solid catalyst component according to claim 10, wherein said temperature is within the range of 80°-136° C.

29. A solid catalyst component according to claim 12, wherein said temperature is within the range of 80°-136° C.

30. A solid catalyst component according to claim 13, wherein said temperature is within the range of 80°-136° C.

31. A solid catalyst component according to claim 6, wherein said first and second portions of titanium tetrachloride (c) are reacted for a period of from 5 minutes to 100 hours.

32. A solid catalyst component according to claim 8, wherein said first and second portions of titanium tetrachloride (c) are reacted for a peroid of from 5 minutes to 100 hours.

33. A solid catalyst component according to claim 10, wherein said first and second portions of titanium tetrachloride (c) are reacted for a period of from 5 minutes to 100 hours.

34. A solid catalyst component according to claim 12, wherein said first and second portions of titanium tetrachloride (c) are reacted for a period of from 5 minutes to 100 hours.

35. A solid catalyst component according to claim 13, wherein said first and second portions of titanium tetrachloride (c) are reacted for a period of from 5 minutes to 100 hours.

36. A solid catalyst component according to claim 17, wherein said first and second portions of titanium tetrachloride (c) are reacted for a period of from 5 minutes to 100 hours.

37. A solid catalyst component according to claim 6, wherein said reaction time period is from 5 minutes to 10 hours.

38. A solid catalyst component according to claim 8, wherein said reaction time period is from 5 minutes to 10 hours.

39. A solid catalyst component according to claim 10, wherein said reaction time period is from 5 minutes to 10 hours.

40. A solid catalyst component according to claim 12, wherein said reaction time period is from 5 minutes to 10 hours.

41. A solid catalyst component according to claim 13, wherein said reaction time period is from 5 minutes to 10 hours.

42. A solid catalyst component according to claim 17, wherein said reaction time period is from 5 minutes to 10 hours.

43. A solid catalyst component according to claim 21, wherein said reaction time period is from 5 minutes to 10 hours.

44. A solid catalyst component according to claim 22, wherein said reaction time period is from 5 minutes to 10 hours.

45. A solid catalyst component according to claim 23, wherein said reaction time period is from 5 minutes to 10 hours.

46. A solid catalyst component according to claim 24, wherein said reaction time period is from 5 minutes to 10 hours.

47. A solid catalyst component according to claim 25, wherein said reaction time period is from 5 minutes to 10 hours.

48. A solid catalyst component according to claim 26, wherein said reaction time period is from 5 minutes to 10 hours.

49. A solid catalyst component according to claim 27, wherein said reaction time period is from 5 minutes to 10 hours.

50. A solid catalyst component according to claim 28, wherein said reaction time period is from 5 minutes to 10 hours.

51. A solid catalyst component according to claim 29, wherein said reaction time period is from 5 minutes to 10 hours.

52. A solid catalyst component according to claim 30, wherein said reaction time period is from 5 minutes to 10 hours.

* * * * *